United States Patent
Yun

(10) Patent No.: US 7,436,768 B2
(45) Date of Patent: Oct. 14, 2008

(54) METHOD, APPARATUS AND COMPUTER PROGRAM FOR TRANSMITTING A PACKET

(75) Inventor: Yeou-Sun Yun, Suwon-si (KR)

(73) Assignee: Samsung Electronic Co., Ltd., Gyeonggi-do (KR)

( * ) Notice: Subject to any disclaimer, the term of this patent is extended or adjusted under 35 U.S.C. 154(b) by 850 days.

(21) Appl. No.: 10/879,097

(22) Filed: Jun. 30, 2004

(65) Prior Publication Data

US 2004/0264459 A1    Dec. 30, 2004

(30) Foreign Application Priority Data

Jun. 30, 2003    (KR)    ...................... 10-2003-0043839

(51) Int. Cl.
*H04L 12/26*    (2006.01)
(52) U.S. Cl. ..................................... 370/230.1; 709/223
(58) Field of Classification Search ............. 370/230.1, 370/231–235; 709/223
See application file for complete search history.

(56) References Cited

U.S. PATENT DOCUMENTS

| 5,481,312 A | 1/1996 | Cash et al. |
| 6,553,031 B1 | 4/2003 | Nakamura et al. |
| 7,215,637 B1 * | 5/2007 | Ferguson et al. ......... 370/230.1 |

FOREIGN PATENT DOCUMENTS

| KR | 1999-22705 | 3/1999 |
| WO | WO 03/043272 A1 | 5/2003 |

OTHER PUBLICATIONS

German Office Action dated Mar. 31, 2006.
Korean Office Action dated Jun. 24, 2005.

* cited by examiner

*Primary Examiner*—Frank Duong
*Assistant Examiner*—Wanda Z Russell
(74) *Attorney, Agent, or Firm*—Harness, Dickey & Pierce, PLC

(57) ABSTRACT

An apparatus, method and computer program for transmitting a packet is described which may enable one or more (or all) blocks of a received packet to be transmitted in accordance with the priority of one or more (or all) of the blocks. A packet may be divided into a plurality of blocks, where one or more (or all) of the plurality of blocks may include priority information indicating a priority of one or more of the blocks. A look-up table may be generated to include information related to one or more of a source address, a destination address, a length of the packet and a medium access control address. Block information for one or more of the plurality of blocks may be generated based on the priority information and the look-up table information, and one or more (or all) blocks of the packet may be transmitted based on the block information.

42 Claims, 13 Drawing Sheets

METHOD, APPARATUS AND COMPUTER PROGRAM FOR TRANSMITTING A PACKET

PRIORITY STATEMENT

This application claims priority from Korean Patent Application No. 2003-43839, filed on Jun. 30, 2003 in the Korean Intellectual Property Office (KIPO), the contents of which are incorporated herein by reference in its entirety.

BACKGROUND OF THE INVENTION

1. Field of the Invention

The present invention generally relates to a method, apparatus and computer program for transmitting a packet in a data communication system.

2. Description of the Related Art

An Ethernet switch may transmit a packet provided from a first port to a second port based on a weighted round robin (hereafter, referred to as "WRR") method. In the WRR method, a high priority packet and a low priority packet may be transmitted to the second port based on a weight. For example, if the weight is 8, this means that eight high priority packets may be transmitted to the second port for every one low priority packet that is transmitted thereto.

However, if the low priority packet has a longer length than the high priority packet, the high priority packet may, in fact, not be transmitted prior to the low priority packet. For example, when the total length of eight high priority packets are substantially identical to the length of one low priority packet, the high priority packets may, in fact, not be transmitted prior to the low priority packet.

SUMMARY OF THE INVENTION

An exemplary embodiment of the present invention is directed to an apparatus for transmitting a packet. The apparatus may include a first port controller for generating priority information corresponding to one or more (or all) of a plurality of blocks of the packet. The packet may be provided from a first port and may be divided into the plurality of blocks. Each of the blocks may be composed of M bytes, where M is an integer greater than or equal to 64. The apparatus may include a look-up section for generating a look-up table based on the blocks. The look-up table may include a source address, a destination address, a length of the packet and a medium access control address. The apparatus may include a packet memory for storing the blocks, and a queue manager for monitoring a status of the packet memory to generate a packet memory status information, a block transmitting signal and a surplus block transmitting signal based on the priority information and the look-up table. The apparatus may include a second port controller for transmitting one or more of the plurality of blocks to a second port based on the priority information.

Another exemplary embodiment of the present invention is directed to a method of transmitting a packet. In the method, a packet provided at a first port may be divided into a plurality of blocks. Each of the blocks may be composed of M bytes, where M is an integer greater than or equal to 64. The look-up table may be generated based on the blocks and priority information corresponding to one or more of the plurality blocks may be obtained. Block information may be generated based on the priority information in the look-up table, and one or more of the plurality of blocks may be transmitted to a second port based on the block information.

Another exemplary embodiment of the present invention is directed to an apparatus for transmitting a packet based on priority. The apparatus may divide the packet at a first port into a plurality of blocks and may generate priority information corresponding to one or more of the blocks. The apparatus may transmit the blocks to a second port based on the priority information. One or more or all the blocks may be composed of M bytes where M is an integer greater than or equal to 64.

Another exemplary embodiment of the present invention is directed to a method of transmitting a packet based on a priority. In the method, the packet may be divided into a plurality of blocks, with one or more (or all) of the blocks composed of M bytes, M being an integer greater than or equal to 64. Priority information corresponding to one or more of the blocks may be obtained, and one or more of the blocks may be transmitted to a second port based on the priority information.

Another exemplary embodiment of the present invention is directed to a method for transmitting one or more blocks of a packet. In the method, priority information related to a priority of one or more (or all) of the blocks may be obtained, and one or more of the blocks may be transmitted based on the priority information.

Another exemplary embodiment of the present invention is directed to an apparatus for transmitting one or more blocks of a packet. The apparatus may include a first controller for generating priority information corresponding to one or more (or all) of the blocks of the packet that are received at a first port. A memory may be provided for storing blocks and the priority information, and a second port controller may transmit one or more of the blocks to a second port based on the stored priority information.

Another exemplary embodiment of the present invention is directed to a computer program product. A computer product may include a computer readable medium having computer program logic stored thereon for enabling a processor to transmit a packet. The computer program logic may cause the processor to divide the packets into a plurality of blocks, where one or more (or all) of the plurality of blocks may include priority information indicating a priority of the one or more blocks. The logic may cause the processor to generate a look-up table including information related to one or more of the source address, a destination address, a length of the packet and a medium access control address. The logic may cause the processor to generate block information for one or more (or all) of the plurality of blocks based on the priority information and the look-up table information, and may cause the processor to transmit one or more of the blocks based on the block information.

Another exemplary embodiment of the present invention is directed to a computer program product comprising a computer-readable medium having computer program logic stored thereon for enabling a processor to transmit one or more blocks of a packet. The computer program logic may cause the processor to obtain priority information relating to a priority of one or more (or all) of the blocks, and to transmit one or more of the blocks based on the priority information.

Another exemplary embodiment of the present invention is directed to a computer data signal embodied in a carrier wave. The computer data signal may include a first code segment for dividing a packet into a plurality of blocks, for one or more (or all) of the plurality of blocks may include priority information indicating a plurality of one or more blocks. The computer data signal may include a second code segment for generating a look-up table including information relating to one or more a source address, a destination address, a length of the packet and a medium access control address. The computer data signal may include a third code segment for generating block information for one or more (or all) of the plurality of blocks based on the priority information in the look-up table information, and a fourth code segment for transmitting one or more blocks of the packet based on the block information.

Another exemplary embodiment of the present invention is directed to a computer data signal embodied in the carrier wave. The computer data signal may include the instructions for obtaining priority information relating to the priority of one or more (or all) blocks of a packet, and instructions for transmitting one or more (or all) blocks of the packet based on the priority information.

Another exemplary embodiment of the present invention is directed to a packet adapted to be transmitted and received in a communication system. The packet may include a source address, destination address, packet length information, packet data and priority information of the packet.

BRIEF DESCRIPTION OF THE DRAWINGS

The present invention will become more apparent to those of ordinary skill in the art by describing, in detail, exemplary embodiments thereof with reference to the attached drawings, wherein like elements are represented by like reference numerals, which are given by way of illustration only and thus do not limit the exemplary embodiments of the present invention.

DETAILED DESCRIPTION OF THE EXEMPLARY EMBODIMENTS

Figure 1:
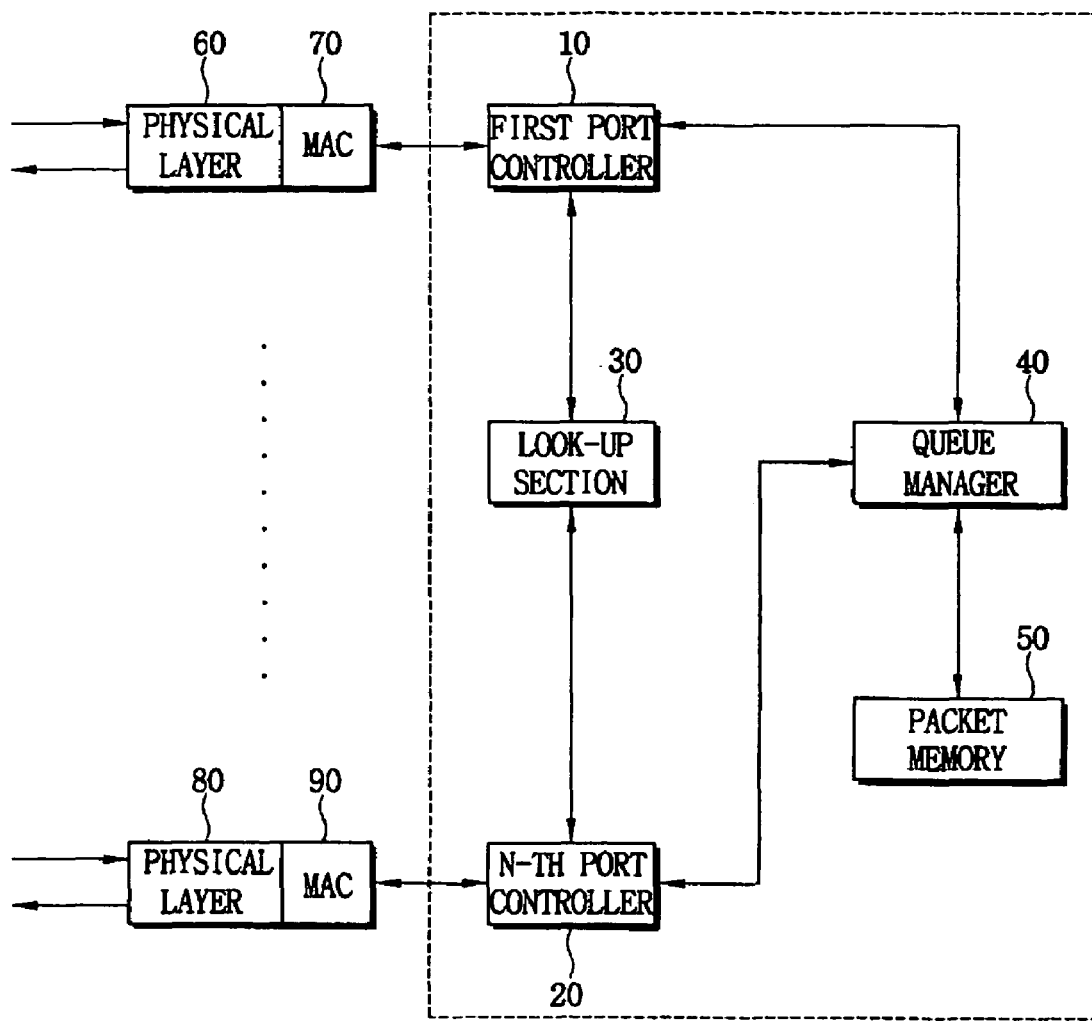
FIG. 1 is a block diagram illustrating an apparatus for transmitting a packet according to an exemplary embodiment of the present invention.

FIG. 1 is a block diagram illustrating an apparatus for transmitting a packet according to an exemplary embodiment of the present invention. In FIG. 1, the apparatus may include a plurality of port controllers 10 and 20, a look-up section 30, a queue manager 40 and a packet memory 50, for example.

Although only two port controllers 10 and 20 are shown, one of ordinary skill in the art could configure the apparatus to include fewer or greater than two port controllers, shown here merely as an exemplary port controller configuration. Port controllers 10 and 20 may be embodied in hardware and/or software as one or more digital microprocessors that may be provided on a suitable printed circuit card such as an Ethernet card or on a computer including the Ethernet card. However, instead of a digital microprocessor, port controllers 10 and 20 may also be embodied as an analog processor, digital signal processor and/or one or more application specific integrated circuits controlled by a suitable microcontroller or microprocessor (not shown).

Power to the apparatus may be provided by a suitable AC power source of the computer including the apparatus and/or by an embedded battery pack, such as a rechargeable secondary battery pack including battery cells having any of a Lithium ion (Li+), nickel cadmium (NiCd) or nickel metal hydride (NiMH) cell chemistry, as known, which provides power to the apparatus, for example.

Each of the port controllers 10 and 20 may receive blocks (hereafter referred to as 'first blocks') corresponding to a first packet transmitted from a given port, and may extract priority information from the received blocks representing the priorities of one or more (or all) of the received blocks. Each of the port controllers 10 and 20 may transmit blocks (hereafter referred to as 'second blocks') corresponding to a second packet to another port.

The first packet may include the priority information. The first packet may include at least one high priority block and/or at least one low priority block. As an example, the first packet may include two or more high priority blocks/low priority blocks. The high priority blocks may be transmitted prior to the low priority blocks. Hereafter, for example, the first packet may be transmitted from a first port, and may be provided to (or received at) an Nth (N being an integer greater than 2) port. Accordingly, one of ordinary skill in the art may configure the apparatus to transmit to, and receive from, any desired number of ports.

The transmission sequence of the first blocks may depend on the priority information. In other words, a packet having a high or higher priority relative to other packets may be transmitted prior to other packets having a low or lower relative priority. In addition, the first packet may be divided into a plurality of first blocks, and then the first blocks may be transmitted to the port controller 10. The first packet may be divided into M (an integer equal to or greater than 64) bytes of first blocks. For example, M may be 64.

The first port controller 10 may transmit the first blocks to the look-up section 30. The look-up section 30 may generate a look-up table based on the first blocks. The look-up table may include a source address, a destination address, and a medium access control (MAC) address, for example. The first port controller 10 may thus receive information corresponding to the look-up table.

The packet memory 50 may be embodied as any suitable type of non-volatile memory such as random access memory (RAM), for example. The packet memory 50 may receive the first blocks, and then may store the first blocks. The packet memory 50 may store the first blocks in the ports, for example.

The queue manager 40 may receive the priority information and the information related to the look-up table, and may generate a block transmitting signal and a surplus block transmitting signal based on the priority information and the look-up table information. In addition, the queue manager 40 may be coupled to the packet memory 50 to monitor status of the packet memory 50, and may transmit one or more of the block transmitting signal, surplus block transmitting signal and packet memory status information to the port controllers 10 and 20. For example, the queue manager 40 may store information related to the first blocks (first block information) in the ports based on the priority information and the look-up table information. The first block information may be related to a priority of one or more of the first blocks, for example.

The apparatus may further include a plurality of physical layers 60 and 80, and a plurality of medium access controls (MAC) units 70 and 90. Although a pair of physical layers 60, 80 and a pair of MAC units 70, 90 are shown in FIG. 1, one of ordinary skill in the art may configure the apparatus to communicate with any desired number of physical layers and MAC units. When the first packet is received from the first port, the first physical layer 60 may convert an analog signal corresponding to the first packet into a digital signal. When the first packet is transmitted to the N-th port, the N-th physical layer 80 may convert a digital signal corresponding to the first packet into an analog signal.

When the first packet is received from the first physical layer 60, first MAC unit 70 may divide the first packet into the first blocks. In addition, the first MAC unit 70 may transmit the first blocks to the first port controller 10. When the first blocks are transmitted to the N-th port, the N-th MAC unit 90 may synthesize the first blocks to generate the first packet, and may transmit the first packet to the N-th port controller 20. Accordingly, in the example of FIG. 1, each MAC unit 70 and 90 may correspond to a respective port controller 10 and 20.

The apparatus of FIG. 1 may thus divide the first packet having the priority information into M (M≧64) bytes of units to generate the first blocks, and may transmit the first blocks to the N-th port based on the priority information of the respective first blocks, so that the apparatus may efficiently transmit the first packet to the N-th port.

Figure 2:
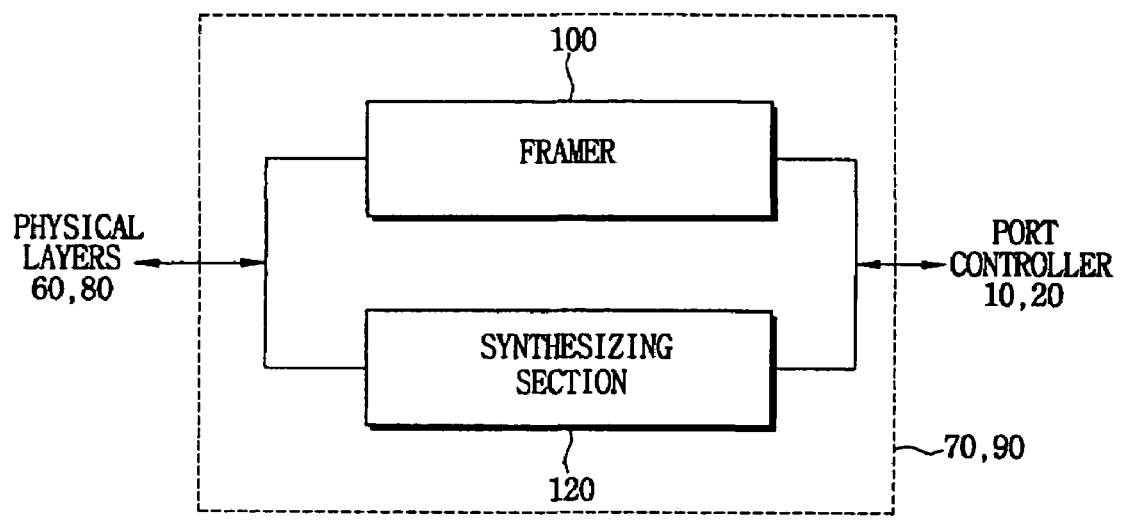
FIG. 2 is a block diagram illustrating a medium access control (MAC) of FIG. 1 according to an exemplary embodiment of the present invention.

FIG. 2 is a block diagram illustrating the medium access control (MAC) of FIG. 1 according to an exemplary embodiment of the present invention. As shown in FIG. 2, each of the MAC units 70 and 90 may include a framer 100. The framer 100 may divide the first packet into the first blocks. Each of the first blocks may include M bytes. For example, M may be 64. The first packet may include priority information from the first blocks representing the priorities of one or more (or all) of the first blocks. In other words, the first packet may be comprised of high (or higher) priority blocks and/or low or lower priority blocks of the first packet.

Referring to FIG. 2, each of the MAC units 70 and 90 may also include a synthesizing section 120. The synthesizing section 120 may synthesize (i.e., combine) the first blocks transmitted from one of the N port controllers 10 and 20 to generate the first packet, for example.

Figure 3A:
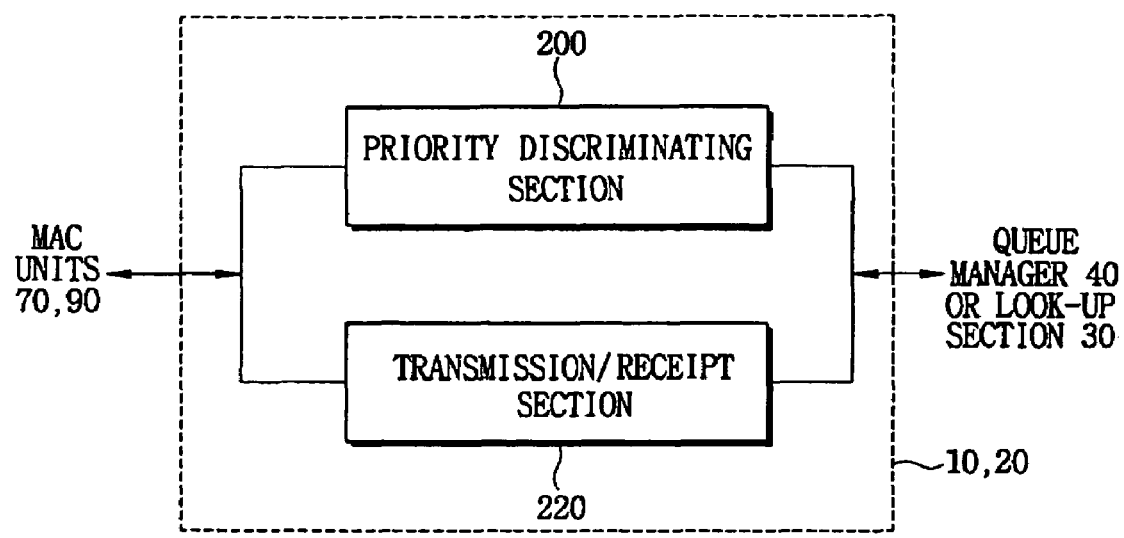
FIG. 3A is a block diagram illustrating a port controller of FIG. 1 according to an exemplary embodiment of the present invention.

FIG. 3A is a block diagram illustrating the port controller of FIG. 1 according to an exemplary embodiment of the present invention. As shown in FIG. 3A, each of the port controllers 10 and 20 may include a priority discriminating section 200 and a transmitting/receiving section 220. There may be first to Nth transmitting/receiving sections 220 as is evident to one having ordinary skill in the art.

The priority discriminating section 200 may extract the priority from the first blocks, and may transmit the priority information to the queue manager 40.

A 'first' transmitting/receiving section 220 may transmit first blocks to the look-up section 30 and the packet memory 50, and may read the second blocks of a second packet from the packet memory 50. The first transmitting/receiving section 220 may transmit the look-up table information and the priority information to the queue manager 40. An 'N-th' transmitting/receiving section 220 may receive the block transmitting information, the surplus block transmitting information and packet memory status information.

Different priorities of the blocks may corresponds to different ports. For example, the priority may be changed depending on the number of first blocks. However, priority could also be determined by another suitable method known to one of the ordinary skill in the art.

Figure 3B:
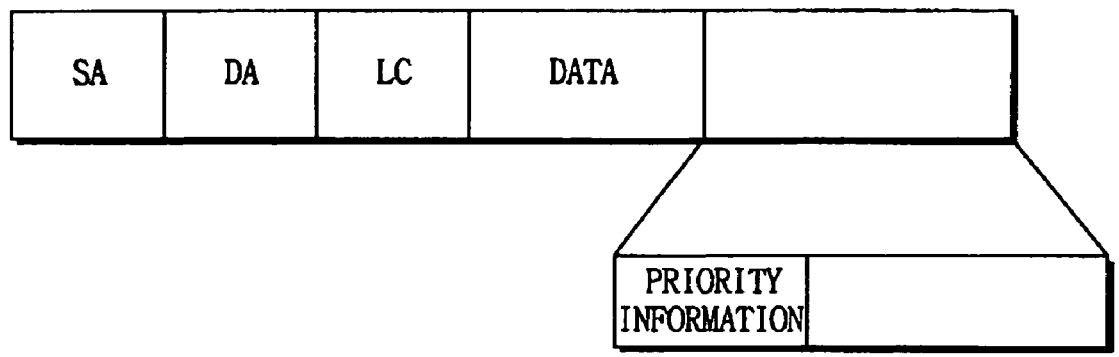
FIG. 3B is a block diagram illustrating a packet according to an exemplary embodiment of the present invention.

FIG. 3B is a block diagram illustrating a packet according to an exemplary embodiment of the present invention. Referring to FIG. 3B, a packet may include one or more fields containing a source address (SA), a destination address (DA), a packet length (LC), data, and priority information, for example. The priority information may include high priority information and/or low priority information, for example.

Figure 3C:
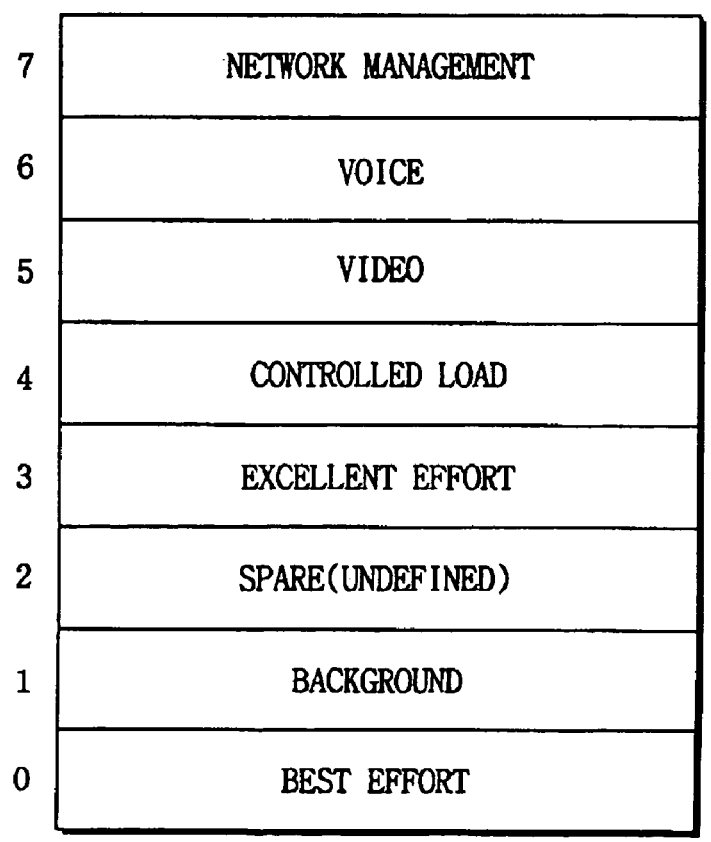
FIG. 3C is a block diagram illustrating a priority arrangement for a packet according to IEEE 802.1p.

FIG. 3C is a block diagram illustrating a priority arrangement for a packet according to IEEE 802.1p. Referring to FIG. 3C, the priority of the packet may be arranged into 8 classes according to the IEEE 802.1p standard. Information may be ranked based on importance, for example, thus the IEEE 802.1p standard provides a ranking criteria. For example, lower priority information may be allocated to classes 1 through 4, and higher priority information may be allocated to classes 5 through 8, as shown in FIG. 3C. A given information or priority may have a high priority and a low priority. Alternatively, the priority may have a high priority, a middle priority, and a low priority. The priority could also be allocated to classes 1 through 8 by any other method known to one of the ordinary skill in the art. Also, the priority of given blocks of a packet in accordance with the exemplary embodiments may be allocated irrespective of the IEEE 802.1p standard.

Figure 4:
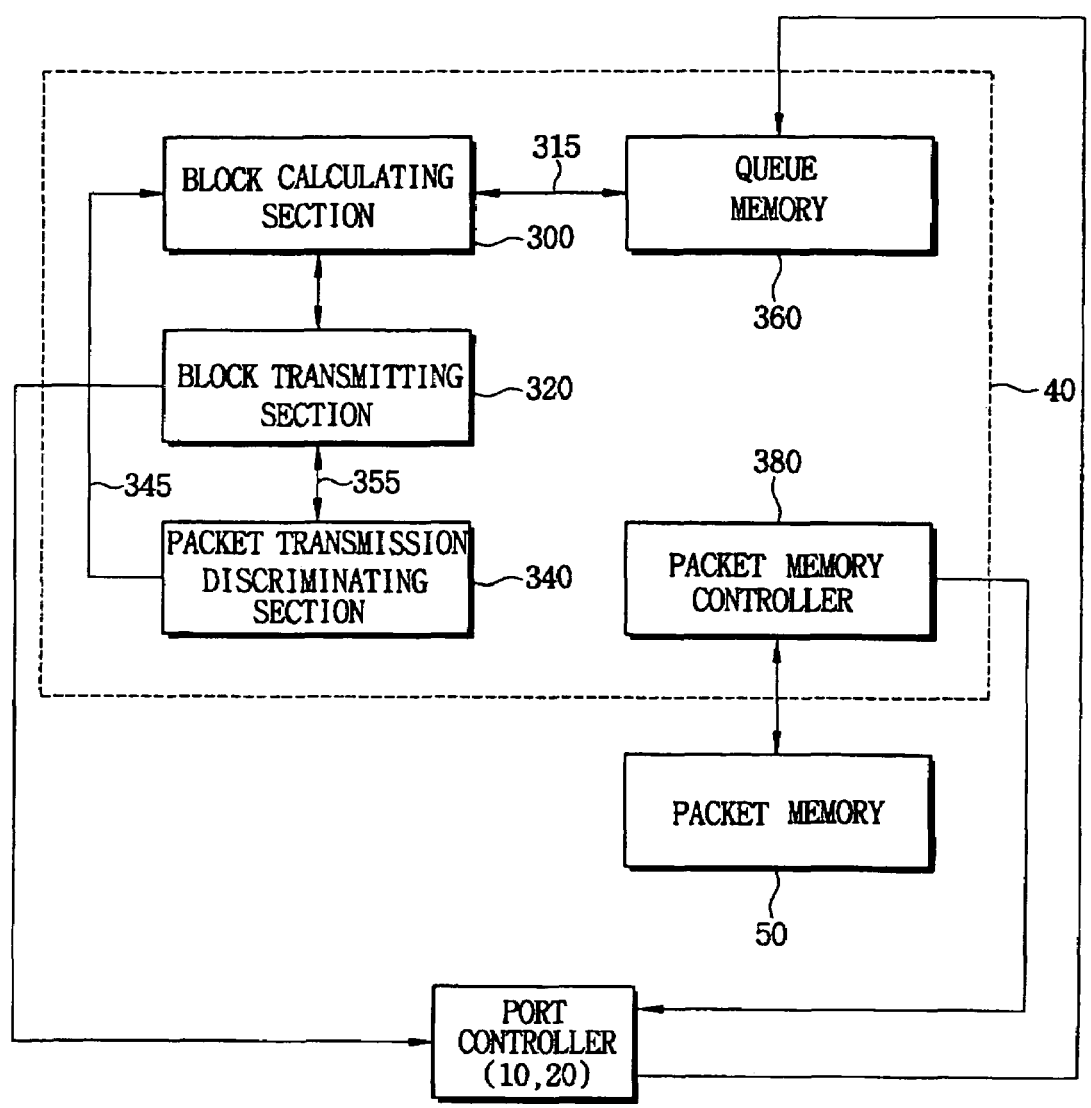
FIG. 4 is a block diagram illustrating a queue manager of FIG. 1 according to an exemplary embodiment of the present invention.

FIG. 4 is a block diagram illustrating the queue manager of FIG. 1 according to an exemplary embodiment of the present invention. Referring to FIG. 4, the queue manager 40 may include a queue memory 360. The queue memory 360 may store the information related to the first blocks (first block information) based on the look-up table information. The queue memory 360 may store the first blocks in the ports. In addition, the queue memory 360 may store the first blocks based on the priority information of the first blocks. Queue memory 360 may be embodied as a suitable non-volatile memory such as RAM, for example.

Queue manager 40 may also include a block calculating section 300. The block calculating section 300 may calculate a first block number based on the first block information received from queue memory 360 (see line 315 of FIG. 4) and feedback block information received via line 345. The feedback block information may include a second block number of the blocks having different priority from that of the first block number of blocks. The first block number may be obtained by multiplying the weight by the second block number (the second block number×the weight), or by dividing the second block number by the weight (the second block number÷the weight). The weight may represent a transmission rate of the high priority blocks and the low priority blocks. For example, if the weight is 8, one low priority block may be transmitted for every transmission of eight high priority blocks.

Queue manager 40 may also include a block transmitting section 320. The block transmitting section 320 may generate the block transmitting signal for transmitting the first blocks to one of the N ports. In addition, the block transmitting section 320 may generate the surplus block transmitting signal.

Referring again to FIG. 4, queue manager 40 may also include a packet transmission discriminating section 340. The packet transmission discriminating section 340 may check whether the packet transmission is completed or not based on the transmitted first blocks. In addition, when one or more blocks of a sub packet, which includes a last transmitted block of the first blocks, are not transmitted, the packet transmission discriminating section 340 may transmit surplus blocks (i.e., blocks other than the transmitted blocks of the sub packet, and may count the number of transmitted first blocks. The first packet may thus include the sub packet. The count value may represent the second block number.

The packet transmission discriminating section 340 may thus transmit the feedback block information, which includes the second block number, to the block calculating section 300, as shown by line 345 in FIG. 4. In addition, the packet transmission discriminating section 340 may transmit information related to the surplus blocks (surplus block information) to the block transmitting section 320, as shown by line 355 in FIG. 4, for example.

Queue manger 40 may further include a packet memory controller 380. The packet memory controller 380 may monitor the status of the packet memory 50, and may transmit packet memory status information to one or both of the port controllers 10 and 20, as shown in FIG. 4.

Figure 5:
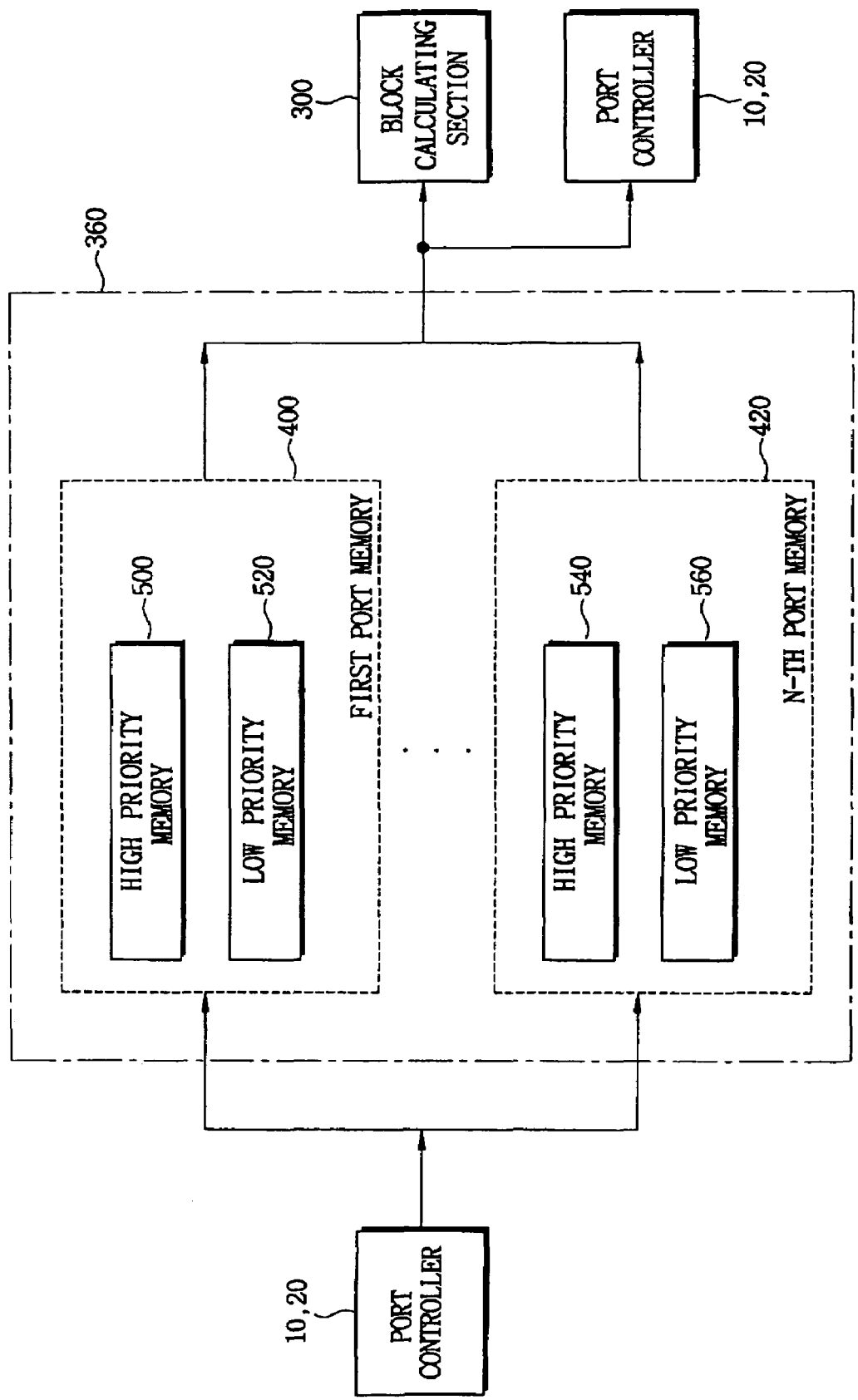
FIG. 5 is a block diagram illustrating a queue memory of FIG. 4 according to an exemplary embodiment of the present invention.

FIG. 5 is a block diagram illustrating the queue memory of FIG. 4 according to an exemplary embodiment of the invention. Referring to FIG. 5, the queue memory 360 may include N port memories 400 and 420. Each of the port memories 400 and 420 may include a high priority memory 500 and 540 and a low priority memory 520 and 560. The port memories 400 and 420 may store the information related to the first blocks based on the look-up table information and the priority information, respectively.

A block may be a high priority block or a low priority block. The high priority blocks may be stored in the high priority memory 500 and/or 540, and the low priority blocks may be stored in the low priority memory 520 and/or 560. The queue memory 360 may transmit the priority information to the block calculating section 300 and one of the port controllers 10 and 20. When the block calculating section 300 receives the priority information, the block calculating section 300 may calculate the number of the first blocks to be transmitted to one of the N ports.

Figure 6:
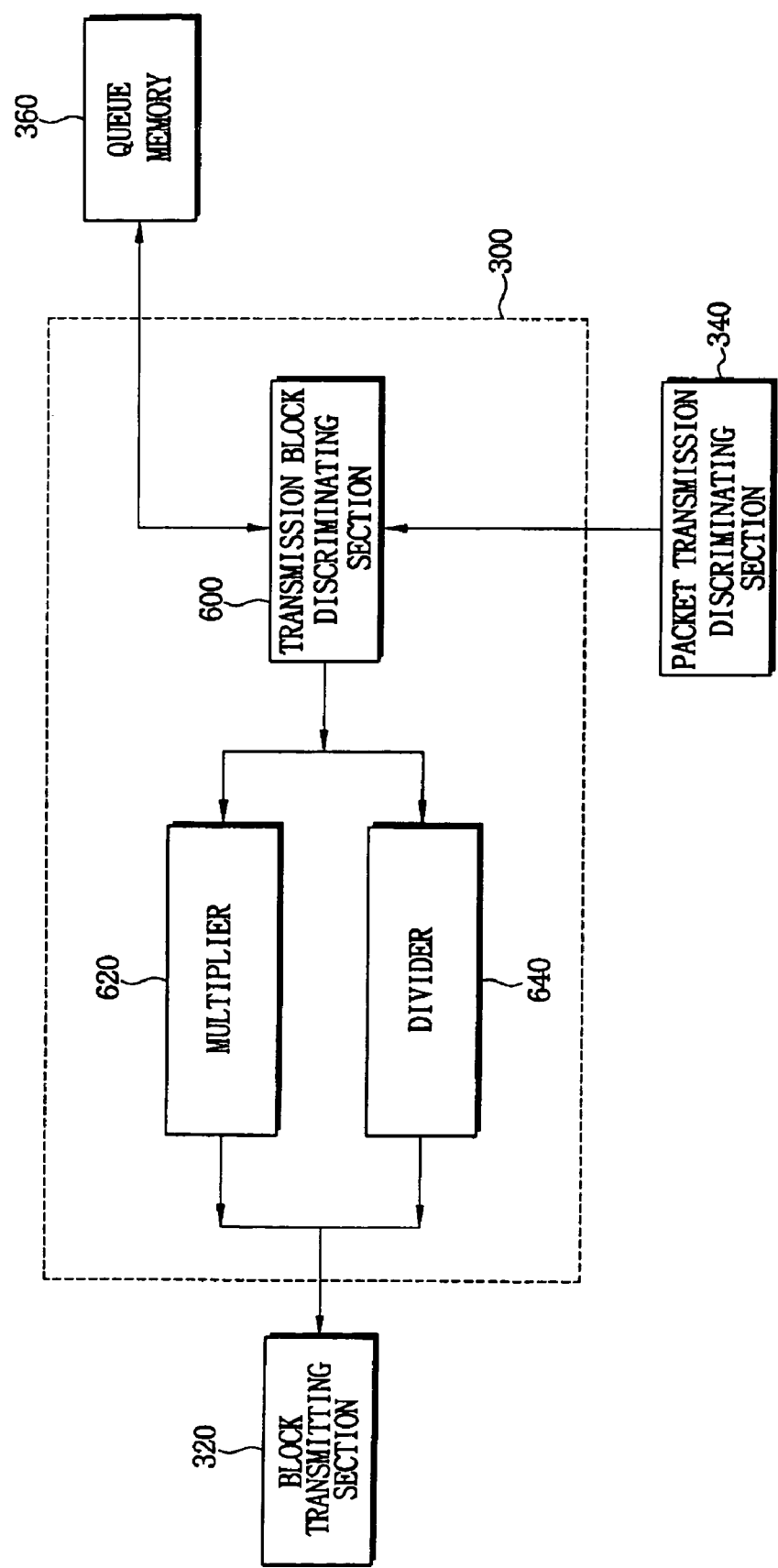
FIG. 6 is a block diagram illustrating a block calculating section of FIG. 4 according to an exemplary embodiment of the present invention.

FIG. 6 is a block diagram illustrating the block calculating section of FIG. 4 according to an exemplary embodiment of the present invention. Referring to FIG. 6, the block calculating section 300 may include a transmission block discriminating section 600. The transmission block discriminating section 600 may receive the priority information from the queue memory 360, and may transmit the received priority information to a multiplier 620 or to a divider 640. In addition, when the high priority blocks or the low priority blocks are transmitted to the one of the N ports, the transmission block discriminating section 600 may receive information related to the transmitted priority blocks from the packet transmission discriminating section 340. The transmission block discriminating section 600 may thus transmit the information related to the transmitted priority blocks to the multiplier 620 or to the divider 640.

The multiplier 620 may multiply the second block number (i.e., number of blocks having different priority from that of the first number of blocks) by the weight based on the priority block transmit information transmitted from the transmission block discriminating section 600. The result of the multiply operation may be the first block number. For example, when the information transmitted from the packet transmission discriminating section 340 is related to low priority blocks (e.g., second block number), the multiplier 620 multiplies the number of transmitted low priority blocks by the weight.

The divider 640 may divide the second block number by the weight based on the information related to the priority block transmitted from the transmission block discriminating section 600. For example, when the information transmitted by the packet transmission discriminating section 340 is related to high priority blocks, the divider 640 may divide the number of the transmitted high priority blocks (in this example, the number of transmitted high priority blocks represents the second block number) by the weight. If the divided value has a decimal point, i.e. a value less than 1, the first block number may be an integer of the divided value.

Figure 7:
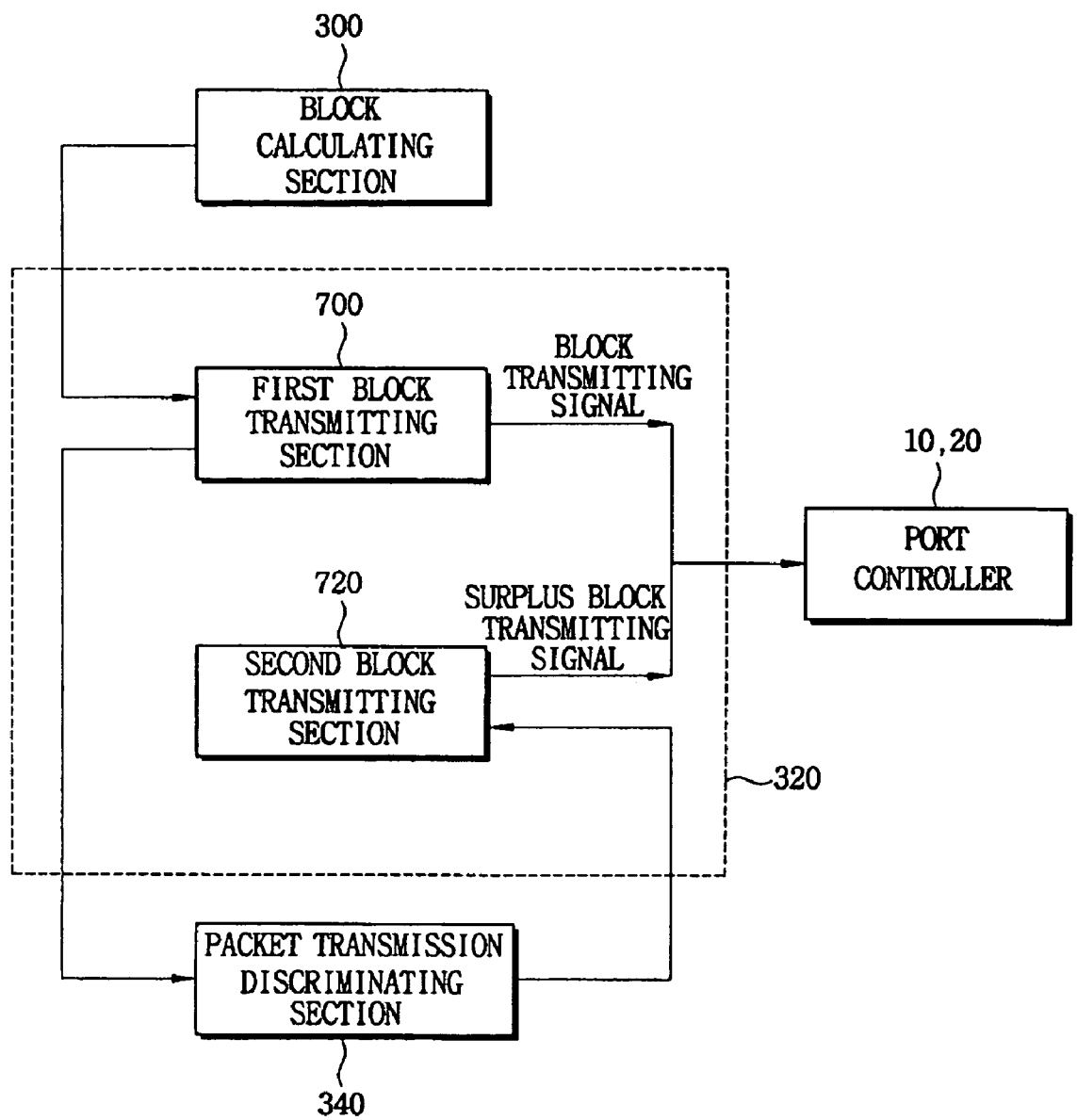
FIG. 7 is a block diagram illustrating a block transmitting section of FIG. 4 according to an exemplary embodiment of the present invention.

FIG. 7 is a block diagram illustrating the block transmitting section of FIG. 4 according to an exemplary embodiment of the present invention. In reference to FIG. 7, the block transmitting section 320 may include a first block transmitting section 700 and a second block transmitting section 720. The first block transmitting section 700 may generate the block transmitting signal for transmitting the first blocks corresponding to the first block number (calculated by the block calculating section 300). In addition, the first block transmitting section 700 may transmit the block transmitting signal to one of the N port controllers 10 and 20.

If one or more of the blocks of the sub packet (the sub packet may correspond to the last transmitted block of the transmitted first blocks represented by the first block number) are not transmitted, the second block transmitting section 720 may generate the surplus block transmitting signal for transmitting the surplus blocks. The second block transmitting section 720 may transmit the surplus block transmitting signal to one of the N port controllers 10 and 20, for example.

Figure 8:
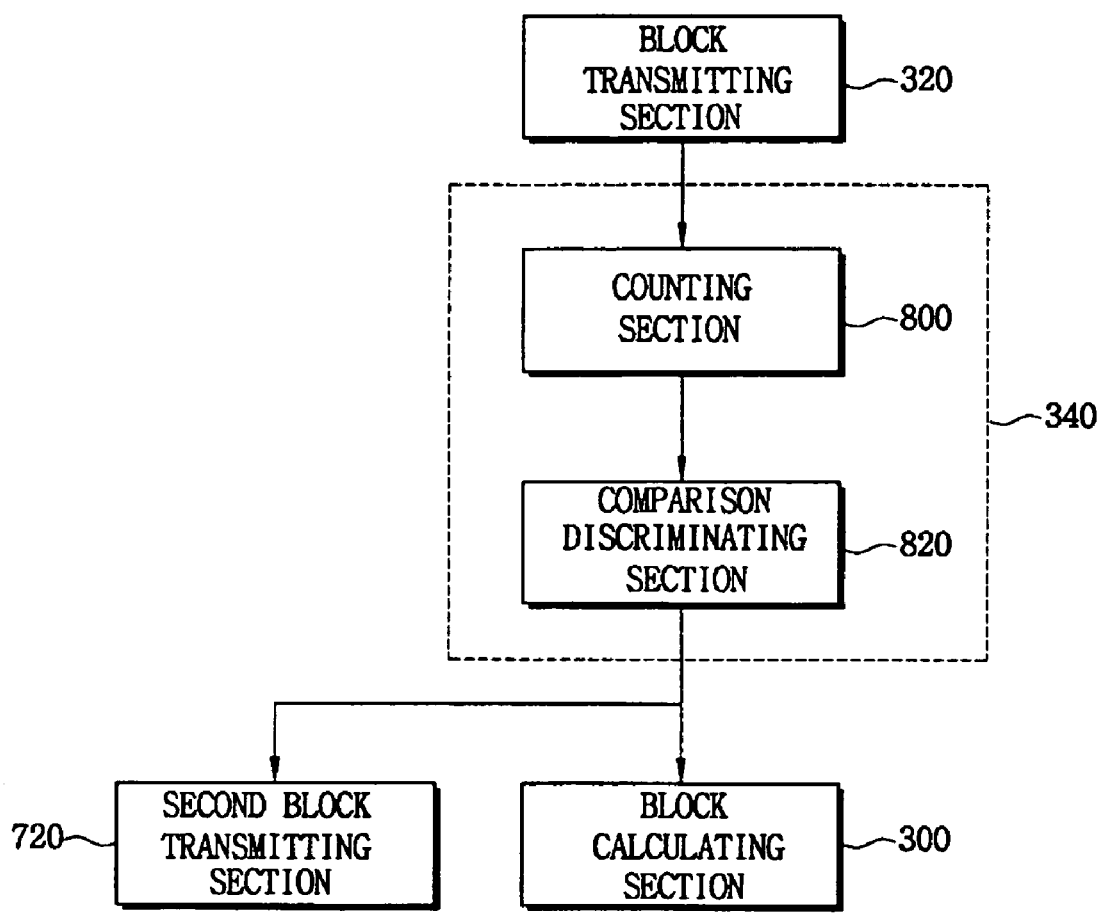
FIG. 8 is a block diagram illustrating a packet transmission discriminating section of FIG. 4 according to an exemplary embodiment of the present invention.

FIG. 8 is a block diagram illustrating the packet transmission discriminating section of FIG. 4 according to an exemplary embodiment of the present invention. Referring to FIG. 8, the packet transmission discriminating section 340 may include a counting section 800 and a comparison discriminating section 820. As the first blocks represented by the first block number are transmitted to one of the N ports, the counting section 800 may count the number of transmitted first blocks. The comparison discriminating section 820 may check whether all the blocks of the sub packet have been transmitted. If one or more some of the blocks of the sub packet have not been transmitted, the comparison discriminating section 820 may transmit information related to the surplus blocks to the second block transmitting section 720. When all the blocks of the sub packet have been transmitted, the total number of transmitted blocks represents the second block number. The comparison discriminating section 820 may thus provide feedback block information including information related to the second block number, for example.

Figure 9:
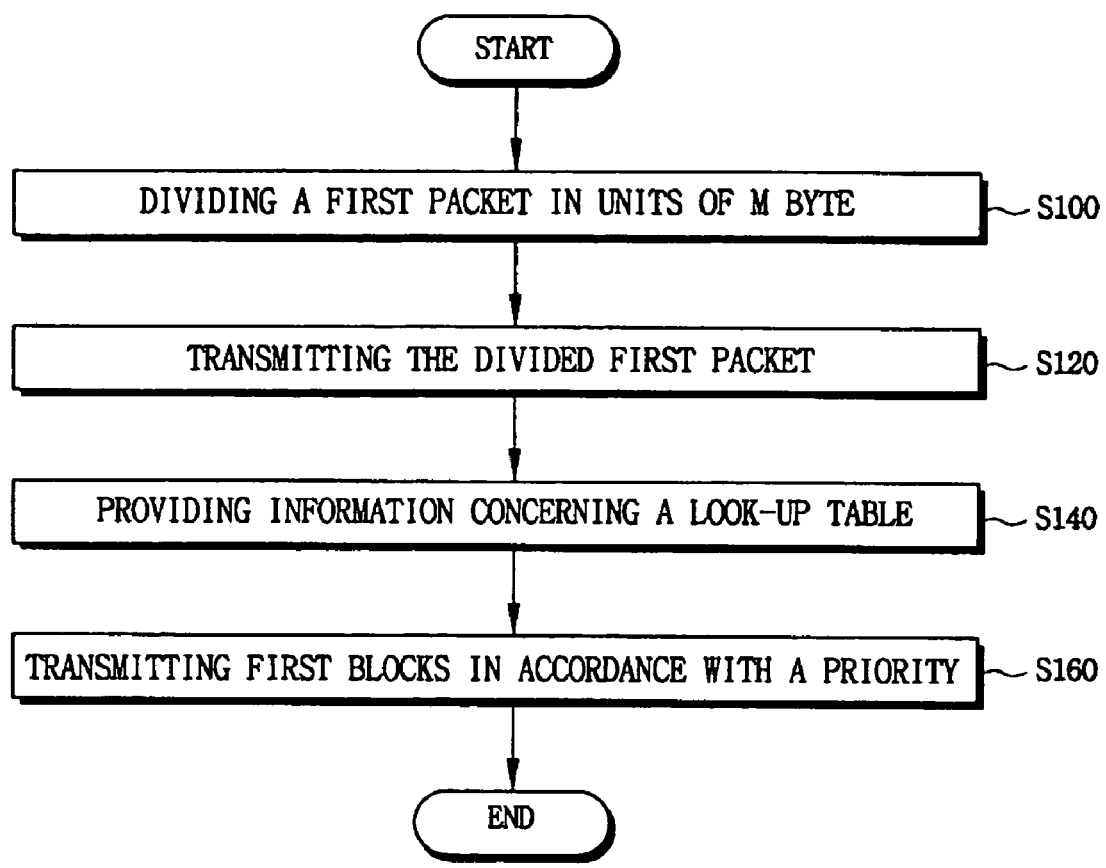
FIG. 9 is a flowchart illustrating a method of transmitting a packet according to an exemplary embodiment of the present invention.

FIG. 9 is a flowchart illustrating a method of transmitting a packet according to an exemplary embodiment of the present invention. Referring to FIG. 9, the first MAC unit 70 may divide (S100) the first packet received from the first port into M bytes of a plurality of first blocks. The first blocks may be transmitted (S120) to the look-up section 30 and packet memory 50. The look-up section 30 may generate the look-up table information based on the first blocks, and may provide (S140) the look-up table information to one or both of the port controllers 10 and 20. One of the port controllers 10 and 20 may transmit the look-up table information to the queue manager 40, for example. The first blocks may be transmitted (S160) to one of the N ports based on one or more of the priority of the first blocks, the look-up table information and the packet memory status information, for example.

Figure 10:
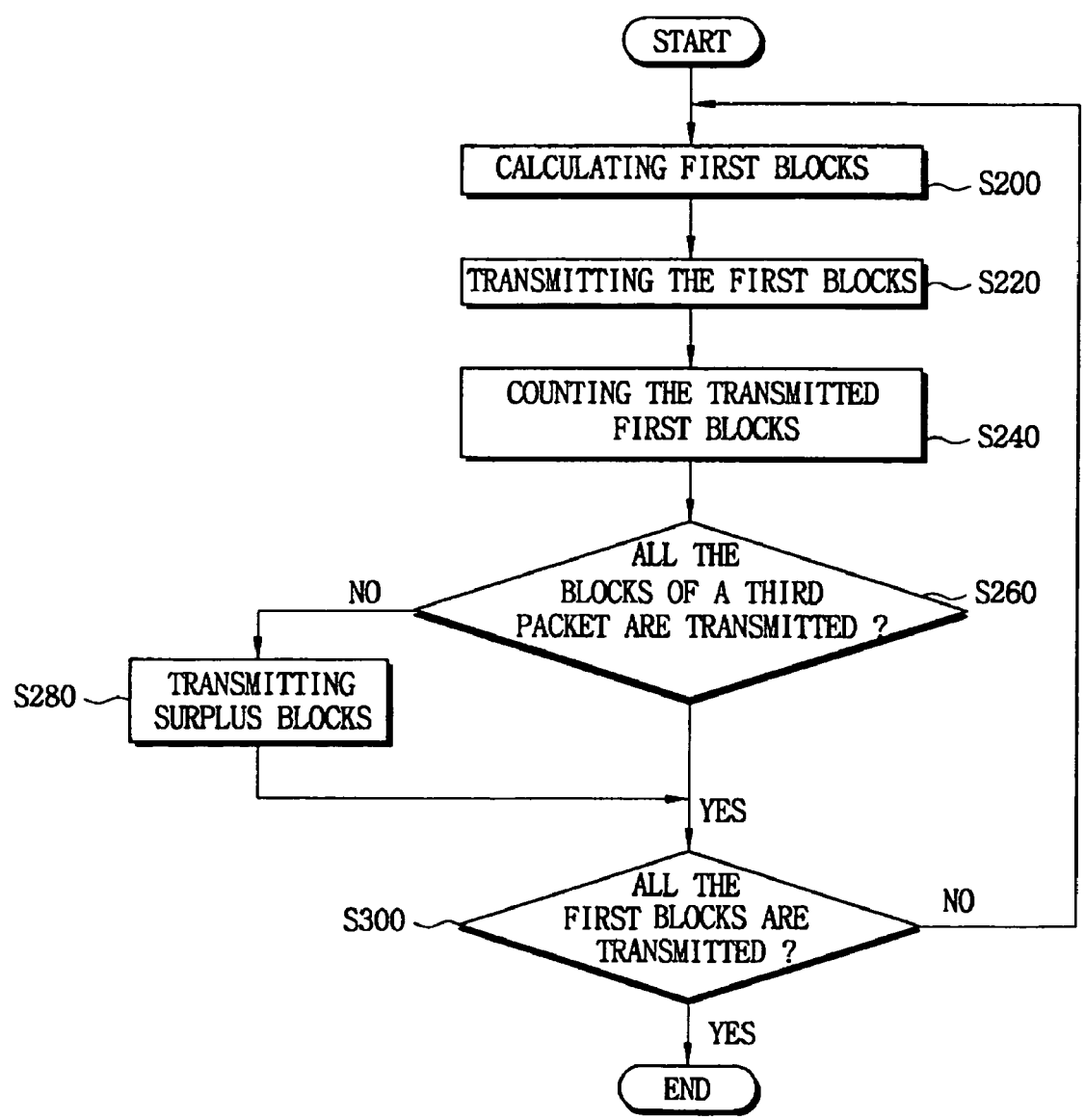
FIG. 10 is a flowchart illustrating a method of transmitting blocks based on priority, according to an exemplary embodiment of the present invention.

FIG. 10 is a flowchart illustrating a method of transmitting blocks in accordance with priority, according to an exemplary embodiment of the present invention. Referring to FIG. 10, the number of first blocks to be transmitted to one of the N ports may be obtained (S200) based on one or more of the priority information related to the first blocks and the feedback block information. The first blocks corresponding to the first block number may be transmitted (S220) to one of the N ports, for example. The number of transmitted first blocks may be counted (S240), and it may be determined whether all the blocks of the sub packet, which may be the last transmitted block, for example, have been transmitted (S260).

If one or more of the blocks of the sub packet were not transmitted (output of S260 is 'NO') surplus blocks of the sub packet may be transmitted (S280) to one of the N ports. Otherwise, when all blocks of the sub packet have been transmitted (output of S260 is 'YES'), it may be determined whether all the first blocks have been transmitted (S300).

If one or more of the first blocks have not been transmitted to one of the N ports (output of S300 is 'NO'), S200 to S260 may be repeated. For example, if the first blocks transmitted at S220 are the high priority blocks, the low and high priority blocks may be transmitted in accordance with the weight. For example, when the weight is 8, one low priority block is transmitted as eight high priority blocks are transmitted. When the surplus blocks are transmitted so that sixteen high priority blocks are transmitted, 2 low priority blocks are transmitted, etc. Further, if the number of the high priority blocks to be transmitted is less than eight, such as six, the low priority blocks are transmitted after all six high priority blocks are transmitted. This process may be repeated until all first blocks have been transmitted to one of the N ports.

Figure 11:
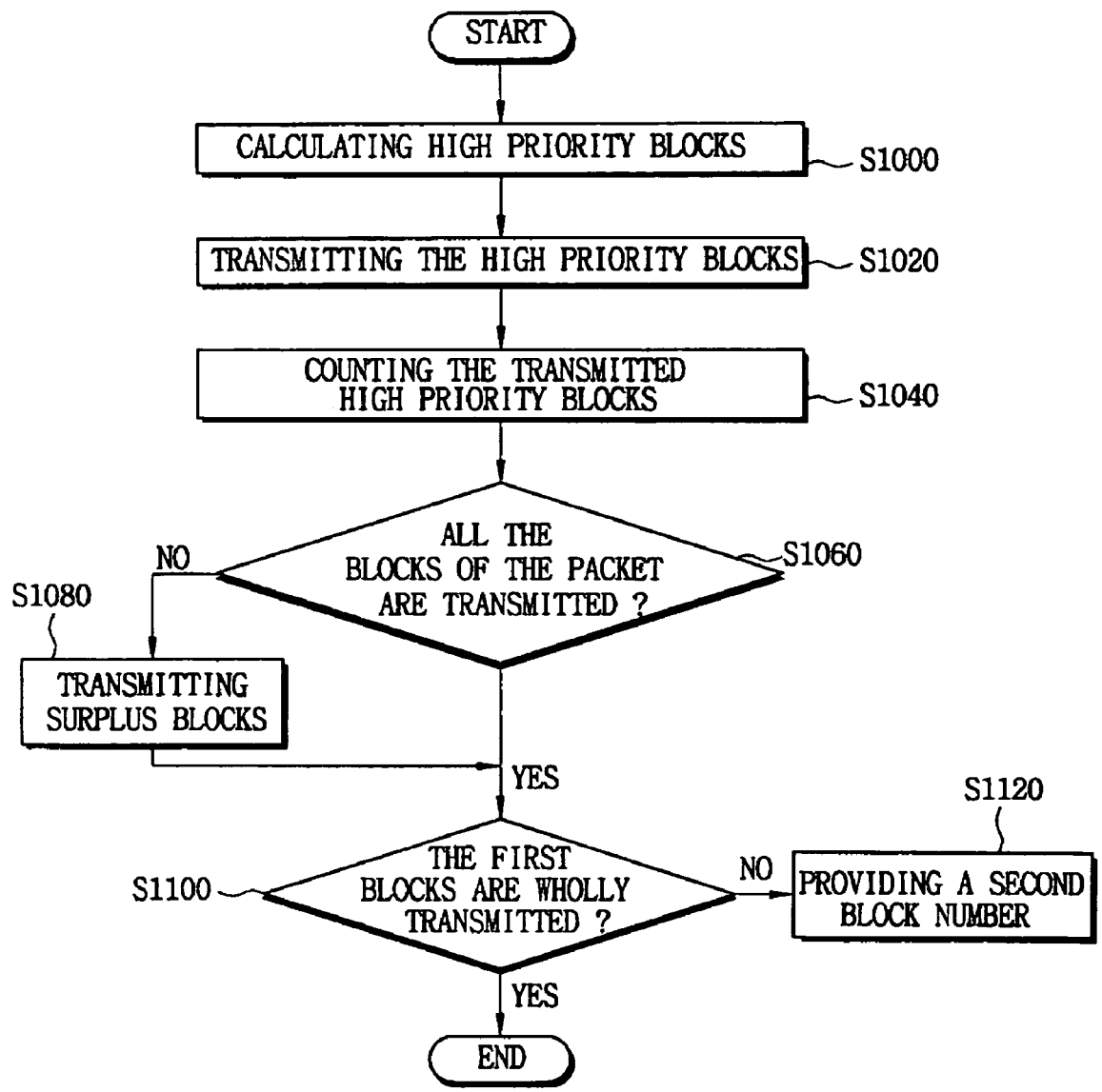
FIG. 11 is a flowchart illustrating a method of transmitting high priority blocks according to an exemplary embodiment of the present invention.

FIG. 11 is a flowchart illustrating a method of transmitting high priority blocks according to an exemplary embodiment of the present invention. In reference to FIG. 11, the number of high priority blocks to be transmitted to one of the N ports may be obtained (S1000) based on the number of the transmitted low priority blocks. In other words, the first block number may be determined based on the second block number multiplied by the weight. The high priority blocks may be transmitted (S1020) to one of the N ports corresponding to the first block number, and the number of transmitted high priority blocks may be counted (S1040).

It may then be determined whether all the blocks of the sub packet, which corresponds to the last transmitted block of the high priority blocks, have been transmitted (S1060). If one or more blocks of the sub packet have not been transmitted (output of S1060 is 'NO'), the surplus blocks (blocks other than those blocks transmitted among the high priority blocks) may be transmitted (S1080). Otherwise, if all blocks of the sub packet were transmitted (output of S1060 is 'YES'), it may be determined whether the first blocks to be transmitted to one of the N ports have been wholly transmitted at S1100 (i.e., have all of the first blocks of the packet, in their entirety, been transmitted). If one or more of the first blocks have not been transmitted (output of S1100 is 'NO'), the second block number may be provided (S1120), such as described in the exemplary case above where the packet transmission discriminating section 340 transmits feedback block information, which includes the second block number, to the block calculating section 300. Otherwise, the processing is complete.

Figure 12:
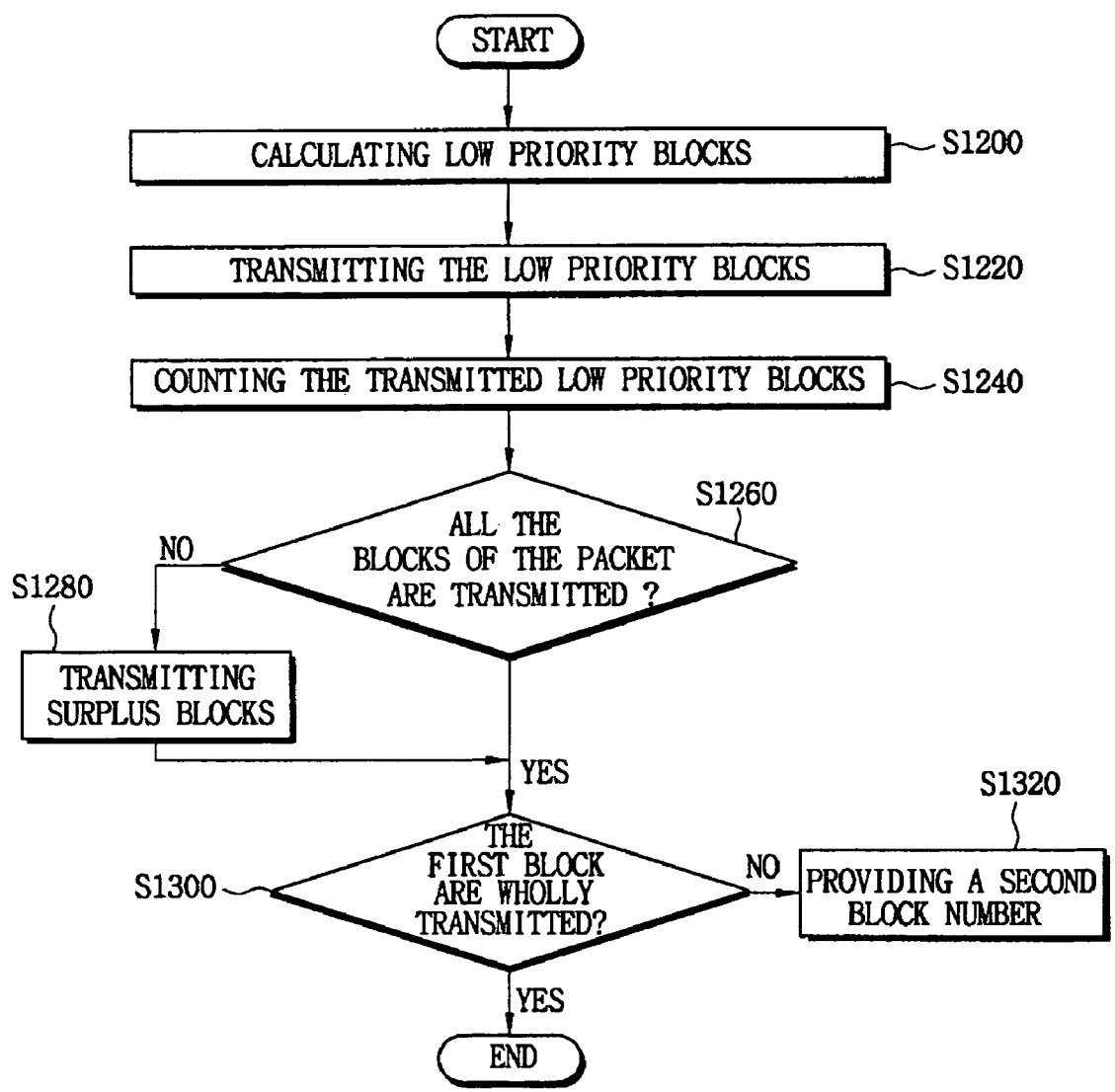
FIG. 12 is a flowchart illustrating a method of transmitting low priority blocks according to an exemplary embodiment of the present invention.

FIG. 12 is a flowchart illustrating a method of transmitting low priority blocks according to an exemplary embodiment of the present invention. Referring to FIG. 12, the number of low priority blocks to be transmitted to one of the N ports may be obtained (S1200) based on the number of the transmitted high priority blocks. For example, the first block number may be obtained by dividing the second block number by the weight. The low priority blocks may be transmitted (S1220) to one of the N ports, where the transmitted low priority blocks may be counted (S1240).

It may then be determined whether all the blocks of the sub packet, (the sub packet having the last transmitted block of the low priority blocks), have been transmitted (S1260). If one or more blocks of the sub packet have not been transmitted (output of S1260 is 'NO'), the surplus blocks (blocks other than those blocks transmitted among the high priority blocks) may be transmitted (S1280). Otherwise, if all blocks of the sub packet were transmitted (output of S1260 is 'YES'), it may be determined whether the first blocks to be transmitted to one of the N ports have been wholly transmitted at S1300 (i.e., have all of the first blocks, in their entirety, been transmitted). If one or more of the first blocks have not been transmitted (output of S1300 is 'NO'), the second block number may be provided (S1320), such as described in the exemplary case above where the packet transmission discriminating section 340 transmits feedback block information, which includes the second block number, to the block calculating section 300. Otherwise, the processing is complete.

As described above, because the packet transmitted from a first port may be divided into a plurality of blocks, the divided blocks may be accurately transmitted to an Nth port in accordance with the priority of the blocks. Additionally, the apparatus for transmitting the packet and method using the same as described with respect to the exemplary embodiments may divide a packet transmitted from the first port in units of M bytes, where the high or higher priority blocks (relative to other blocks) of the packet and the low or lower relative priority blocks of the packet may be constantly transmitted in accordance with the priority.

According to the exemplary embodiments of the present invention, the packet may be divided into a plurality of blocks, and the divided blocks may be accurately transmitted to one of the N ports based on the priority information of the respective blocks. In addition, the high priority blocks and the low priority blocks may be transmitted at a consistent and constant rate based on the priority information of the respective blocks.

The exemplary methods in any of FIGS. 9-12 may be embodied in software as a computer program. For example, a program in accordance with the exemplary embodiments of the present invention may be a computer program product causing a computer to execute one of the exemplary methods of transmission. The computer program product may include a computer-readable medium having computer program logic or code portions embodied thereon for enabling a processor, such as a computer including an Ethernet card or a processor controlling one or more of the port controllers in the apparatus, for example, to perform the methodology to transmit packets and/or blocks in accordance with one or more of the exemplary methods.

The computer-readable storage medium may be a built-in medium installed inside a computer main body or removable medium arranged so that it can be separated from the computer main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media such as MOs; magnetism storage media such as floppy disks (trademark), cassette tapes, and removeable hard disks; media with a built-in rewriteable non-volatile memory such as memory cards; and media with a built-in ROM, such as ROM cassettes.

The computer program logic may thus cause the processor to perform one or more of the exemplary transmission methods described herein. Therefore, by causing a computer to execute the program, the packets and/or blocks may be transmitted by the exemplary method.

These programs may also be provided in the form of an externally supplied propagated signal and/or a computer data signal embodied in a carrier wave. The computer data signal embodying one or more instructions or functions of the exemplary methodology may be carried on a carrier wave for transmission and/or reception by an entity that executes the instructions or functions of the exemplary methodology. For example, the functions or instructions of the exemplary embodiments may be implemented by processing one or more code segments of the carrier wave in a computer controlling a given network configuration such as a local area network (LAN) or in a given Ethernet card of a computer, where instructions or functions may be executed to transmit packets in accordance with the exemplary transmission methods described herein.

Further, such programs, when recorded on computer-readable storage media, may be readily stored and distributed. The storage medium, as it is read by a computer, may enable the transmission of packets and/or blocks by the exemplary transmission methods described herein.

The exemplary embodiments of the present invention being thus described, it will be obvious that the same may be varied in many ways. For example, the functional blocks in FIGS. 1-12 describing the exemplary apparatus and methods may be implemented in hardware and/or software. The hardware/software implementations may include a combination of processor(s) and article(s) of manufacture. The article(s) of manufacture may further include storage media and executable computer program(s). The executable computer program(s) may include the instructions to perform the described operations or functions. The computer executable program(s) may also'be provided as part of externally supplied propagated signal(s). Such variations are not to be regarded as departure from the spirit and scope of the exemplary embodiments of the present invention, and all such modifications as would be obvious to one skilled in the art are intended to be included within the scope of the following claims.

What is claimed is:

1. An apparatus for transmitting a packet, comprising:
   a first port controller for generating priority information corresponding to one or more of a plurality of blocks of the packet, the packet provided from a first port and divided into the plurality of blocks, each of the blocks having M bytes, M being an integer greater than or equal to 64;
   a look-up section for generating a look-up table based on the blocks, the look-up table including a source address, a destination address, a length of the packet and a medium access control address;
   a packet memory for storing the blocks;
   a queue manager for monitoring a status of the packet memory to generate a packet memory status information, and for generating a block transmitting signal and a surplus block transmitting signal based on the priority information and the look-up table; and
   a second port controller for transmitting one or more of the plurality of blocks to a second port based on the priority information,
   wherein the queue manager includes:
   a queue memory for storing block information related to one or more first blocks of the packet to be transmitted to the second port, in accordance with the priority information and the look-up table;
   a block calculating section for calculating a first block number based on the block information;
   a block transmitting section for generating the block transmitting signal for transmitting the first blocks to the second port;
   a packet transmission discriminating section for checking whether transmission of one or more blocks of a sub packet of the packet are completed, for counting total transmitted blocks to calculate a second block number, and for providing the feedback block information including the second block number to the block calculating section, the sub packet having a last block of transmitted blocks corresponding to the first block number; and
   a packet memory controller for monitoring the status of the packet memory.

2. The apparatus of claim 1, further comprising a medium access control (MAC) unit for dividing the packet into the plurality of blocks, and for synthesizing the blocks to generate the packet.

3. The apparatus of claim 1, wherein M is equal to 64.

4. The apparatus of claim 2, wherein the MAC unit includes:
   a framer for dividing the packet into blocks; and
   a synthesizing section for synthesizing the blocks to generate the packet.

5. The apparatus of claim 1, wherein each of the first port controller and the second port controller include:
   a priority discriminating section configured to detect a priority of the blocks to generate the priority information; and
   a transmitting/receiving section configured to receive the block transmitting signal, the surplus transmitting signal and the packet memory status information from the queue manager.

6. The apparatus of claim 1, wherein the queue memory includes a plurality of port memories for storing the block information.

7. The apparatus of claim 6, wherein the plurality of blocks include high priority blocks and low priority blocks;
   wherein each of the port memories includes:
   a high priority memory for storing information related to high priority blocks, and a low priority memory for storing information related to the low priority blocks.

8. The apparatus of claim 1, wherein the block calculating section includes:
   a transmission block discriminating section for receiving the block information and the feedback block information from the queue memory and the packet transmission discriminating section and for providing the block information and the feedback block information to a multiplier and a divider;
   a multiplier for multiplying the second block number by a weight based on the feedback block information; and
   a divider for dividing the second block number by the weight based on the feedback block information.

9. The apparatus of claim 1, wherein the block transmitting section includes:
   a first block transmitting section for generating the block transmitting signal; and a second block transmitting section for generating the surplus block transmitting signal, if one or more of the blocks of the sub packet have not been transmitted.

10. The apparatus of claim 1, wherein the packet transmission discriminating section includes:
   a counting section for counting the total transmitted blocks; and
   a comparison discriminating section for checking whether or not transmission of the blocks of the sub packet is completed, for providing information related to the surplus blocks, if one or more of the blocks of the sub packet have not been transmitted, and for providing the feedback block information to one or more of the block calculating section and block transmitting section.

11. A method of transmitting a packet, comprising the steps of:
   dividing the packet provided at a first port into a plurality of blocks, each of the blocks having M bytes, M being an integer greater than or equal to 64;
   generating a look-up table based on the blocks;
   obtaining priority information corresponding to one or more of the plurality of blocks;
   generating block information based on the priority information and the look-up table;
   transmitting one or more of the plurality of blocks to a second port based on the priority information, wherein the plurality of blocks include first priority blocks and second priority blocks, and the steps of transmitting the blocks includes transmitting the first priority blocks to the second port based on the priority information, generating a feedback block information representing a number of the first priority blocks transmitted to the second port, and transmitting the second priority blocks to the second port based on the feedback block information, and repeating the generating and transmitting of second priority blocks steps; and
   counting a number of transmitted first priority blocks corresponding to a first block number based on the block information;
   determining whether or not transmission of blocks of a sub packet of the packet are completed;
   the sub packet having a last block of the transmitted first priority blocks transmitting surplus blocks of the sub packet to the second port, if one or more of the blocks of the packet are not transmitted to the second port;
   counting the transmitted first priority blocks to generate a second block number; and
   providing the feedback block information with the second block number.

12. The method of claim 11, wherein M is 64.

13. The method of claim 11, wherein a priority of one or more of the blocks includes one of a high priority and a low priority.

14. The method of claim 11, further comprising storing the block information is stored in one or more ports based on the priority information.

15. The method of claim 13, wherein the steps of generating block information includes:
   generating a first block information related to high priority blocks; and
   generating a second block information related to low priority blocks.

16. The method of claim 11, wherein the steps of transmitting first priority blocks includes:
   monitoring a status of a packet memory;
   obtaining the first block number based on the block information; and
   transmitting the first priority blocks to the second port based on the packet memory status information and the first block number.

17. The method of claim 16, wherein the first block number is obtained by multiplying a number of low priority blocks by a weight, when the feedback block information represents the number of the low priority blocks.

18. The method of claim 16, wherein the first block number is obtained by multiplying a number of high priority blocks by a weight, when the feedback block information represents the number of high priority blocks.

19. The method of claim 16, wherein the steps of transmitting surplus blocks includes:
   generating a surplus block transmitting signal; and
   transmitting the surplus blocks to the second port based on the surplus block transmitting signal.

20. The method of claim 16, wherein the steps of transmitting the first priority blocks includes:
   generating a block transmitting signal; and
   transmitting the first priority blocks to the second port based on the block transmitting signal.

21. The method of claim 20, wherein the block transmitting signal includes low priority information for transmitting the low priority blocks.

22. The method of claim 20, wherein the block transmitting signal includes high priority information for transmitting the high priority blocks.

23. The method of claim 11, wherein the step of transmitting the second priority blocks includes:
   obtaining the first block number based on the feedback block information;
   monitoring the status of the packet memory; and
   transmitting the second priority blocks to the second port based on the packet memory status information and the first block number.

24. The method of claim 23, wherein the step of obtaining the first block number includes multiplying a number of the low priority blocks by a weight when the feedback block information includes the number of low priority blocks.

25. The method of claim 23, wherein, the step of obtaining the first block number includes multiplying a number of the high priority blocks by a weight when the feedback block information includes the number of high priority blocks.

26. The method of claim 23, wherein the step of transmitting the second priority blocks includes:
   generating a block transmitting signal; and
   transmitting the second priority blocks to the second port based on the block transmitting signal.

27. The method of claim 26, wherein the block transmitting signal includes high priority information for transmitting high priority blocks.

28. The method of claim 26, wherein the block transmitting signal includes low priority information for transmitting low priority blocks.

29. A method of transmitting a packet, comprising the steps of:
   dividing the packet provided at a first port into a plurality of blocks, each of the blocks having M bytes, M being an integer greater than or equal to 64;
   generating a look-up table based on the blocks;
   obtaining priority information corresponding to one or more of the plurality of blocks;
   generating block information based on the priority information and the look-up table;
   transmitting one or more of the plurality of blocks to a second port based on the priority information, wherein the plurality of blocks include first priority blocks and second priority blocks, and the step of transmitting the blocks includes transmitting the first priority blocks to the second port based on the priority information, generating a feedback block information representing a number of the first priority blocks transmitted to the second port, transmitting the second priority blocks to the second port based on the feedback block information, and repeating the generating and transmitting of second priority blocks steps, wherein the step of transmitting the second priority blocks includes obtaining a first block number based on the feedback block information, monitoring a status of a packet memory, and transmitting the second priority blocks to the second port based on the packet memory status information and the first block number, and wherein the method further includes, counting a number of transmitted first priority blocks of the packet that correspond to the first block number;

determining whether transmission of blocks of a sub packet of the packet are completed the sub packet having a last block of the transmitted first priority blocks;

transmitting surplus blocks of the sub packet to the second port, if one or more blocks of the sub packet have not been transmitted to the second port;

counting the transmitted first priority blocks to generate a second block number; and providing the feedback block information to include second block number.

30. The method of claim 29, wherein the step of transmitting surplus blocks includes:

generating a surplus block transmitting signal; and transmitting the surplus blocks to the second port based on the surplus block transmitting signal.

31. An apparatus for transmitting a packet based on a priority, the apparatus dividing the packet received at a first port into a plurality of blocks, generating priority information corresponding to one or more of the blocks, and transmitting the blocks to a second port based on the priority information, one or more of the blocks having M bytes, M being an integer greater than or equal to 64, wherein the plurality of blocks include first priority blocks and second priority blocks, and the step of transmitting the blocks includes transmitting the first priority blocks to the second port based on the priority information, generating a feedback block information representing a number of the first priority blocks transmitted to the second port, and transmitting the second priority blocks to the second port based on the feedback block information, and repeating the generating and transmitting of second priority blocks steps; and wherein the apparatus, counts a number of transmitted first priority blocks corresponding to a first block number based on the feedback block information;

determines whether or not transmission of blocks of a sub packet of the packet are completed, the sub packet having a last block of the transmitted first priority blocks transmitting surplus blocks of the sub packet to the second port, if one or more of the blocks of the packet are not transmitted to the second port;

counts the transmitted first priority blocks to generate a second block number; and provides the feedback block information with the second block number.

32. A method of transmitting a packet based on a priority, comprising:

dividing the packet at a first port into a plurality of blocks, one or more of the blocks having M bytes, M being an integer greater than or equal to 64;

obtaining priority information corresponding to one or more of the blocks;

transmitting one or more of the blocks to a second port based on the priority information;

wherein the plurality of blocks include first priority blocks and second priority blocks, and the steps of transmitting the blocks includes transmitting the first priority blocks to the second port based on the priority information, generating a feedback block information representing a number of the first priority blocks transmitted to the second port, and transmitting the second priority blocks to the second port based on the feedback block information, and repeating the generating and transmitting of second priority blocks steps; and counting a number of transmitted first priority blocks corresponding to a first block number based on the feedback block information;

determining whether or not transmission of blocks of a sub packet of the packet are completed;

the sub packet having a last block of the transmitted first priority blocks transmitting surplus blocks of the sub packet to the second port, if one or more of the blocks of the packet are not transmitted to the second port;

counting the transmitted first priority blocks to generate a second block number; and providing the feedback block information with the second block number.

33. A method for transmitting one or more blocks of a packet, comprising:

obtaining priority information related to a priority of one or more of the blocks;

transmitting one or more of the blocks based on the priority information, the plurality of blocks include first priority blocks and second priority blocks, and the steps of transmitting the blocks includes transmitting the first priority blocks based on the priority information, generating a feedback block information representing a number of the first priority blocks transmitted to the second port, and transmitting the second priority blocks based on the feedback block information, and repeating the generating and transmitting of second priority blocks steps; and counting a number of transmitted first priority blocks corresponding to a first block number based on the feedback block information;

determining whether or not transmission of blocks of a sub packet of the packet are completed, the sub packet having a last block of the transmitted first priority blocks transmitting surplus blocks of the sub packet, if one or more of the blocks of the packet are not transmitted;

counting the transmitted first priority blocks to generate a second block number; and providing the feedback block information with the second block number.

34. A program, adapted to cause a computer to execute the method of claim 33.

35. A computer-readable storage medium, on which is recorded a program adapted to cause a computer to execute the method of claim 33.

36. The method of claim 33, wherein each of the blocks are composed of M bytes, M being an integer greater than or equal to 64.

37. An apparatus for transmitting one or more blocks of a packet, comprising:

a first controller for generating priority information corresponding to one or more blocks of the packet that are received at a first port;

a memory for storing the blocks and the priority information;

a second controller for transmitting one or more of the blocks to a second port based on the stored priority information;

a queue memory for storing block information related to one or more first blocks of the packet to be transmitted to the second port, in accordance with the priority information and a look-up table;

a block calculating section for calculating a first block number based on the block information;

a block transmitting section for generating a block transmitting signal for transmitting the first blocks to the second port;

a packet transmission discriminating section for checking whether transmission of one or more blocks of a sub packet of the packet are completed, for counting total transmitted blocks to calculate a second block number, and for providing feedback block information including the second block number to the block calculating section, the sub packet having a last block of transmitted blocks corresponding to the first block number; and a packet memory controller for monitoring the status of the packet memory.

38. The apparatus of claim 37, wherein each of the blocks are composed of M bytes, M being an integer greater than or equal to 64.

39. A computer program product comprising a computer-readable medium having computer program logic stored thereon for enabling a processor to transmit one or more blocks of a packet, the computer program logic causing the processor to perform the functions of:

obtaining priority information related to a priority of one or more of the blocks; and transmitting one or more of the blocks based on the priority information, the plurality of blocks including first priority blocks and second priority blocks, and the step of transmitting the blocks includes transmitting the first priority blocks based on the priority information, generating a feedback block information representing a number of the first priority blocks transmitted to the second port, and transmitting the second priority blocks based on the feedback block information, and repeating the generating and transmitting of second priority blocks steps; and counting a number of transmitted first priority blocks corresponding to a first block number;

determining whether or not transmission of blocks of a sub packet of the packet are completed, the sub packet having a last block of the transmitted first priority blocks transmitting surplus blocks of the sub packet, if one or more of the blocks of the packet are not transmitted;

counting the transmitted first priority blocks to generate a second block number; and providing the feedback block information with the second block number.

40. The computer program product of claim 39, wherein each of the blocks are composed of M bytes, M being an integer greater than or equal to 64.

41. A computer readable medium containing computer executable code to perform a method, the method comprising:

a first code segment for dividing a packet into a plurality of blocks, one or more of the plurality of blocks including priority information indicating a priority of the one or more blocks;

a second code segment for generating a look-up table including information related to one or more of a source address, a destination address, a length of the packet and a medium access control address;

a third code segment for generating block information for one or more of the plurality of blocks based on the priority information and the look-up table information;

a fourth code segment for transmitting one or more blocks of the packet based on the block information, the plurality of blocks including first priority blocks and second priority blocks, and the step of transmitting the blocks includes transmitting the first priority blocks based on the priority information, generating a feedback block information representing a number of the first priority blocks transmitted, and transmitting the second priority blocks based on the feedback block information, and repeating the generating and transmitting of second priority blocks steps; and a fifth code segment for counting a number of transmitted first priority blocks corresponding to a first block number;

a sixth code segment for determining whether or not transmission of blocks of a sub packet of the packet are completed, the sub packet having a last block of the transmitted first priority blocks transmitting surplus blocks of the sub packet, if one or more of the blocks of the packet are not transmitted;

a seventh code segment for counting the transmitted first priority blocks to generate a second block number; and an eighth code segment for providing the feedback block information with the second block number.

42. A computer readable medium containing computer executable code to perform a method for obtaining priority information related to a priority of one or more blocks of a packet, the method comprising:

a first code segment for transmitting one or more blocks of the packet based on the priority information, the plurality of blocks including first priority blocks and second priority blocks, and the steps of transmitting the blocks includes transmitting the first priority blocks based on the priority information, generating a feedback block information representing a number of the first priority blocks transmitted, and transmitting the second priority blocks based on the feedback block information, and repeating the generating and transmitting of second priority blocks steps; and a second code segment for counting a number of transmitted first priority blocks corresponding to a first block number based on the feedback block information;

a third code segment for determining whether or not transmission of blocks of a sub packet of the packet are completed, the sub packet having a last block of the transmitted first priority blocks transmitting surplus blocks of the sub packet, if one or more of the blocks of the packet are not transmitted;

a fourth code segment for counting the transmitted first priority blocks to generate a second block number; and a fifth code segment for providing the feedback block information with the second block number.

* * * * *